United States Patent [19]

Toillie et al.

[11] 4,428,185
[45] Jan. 31, 1984

[54] MOWER

[75] Inventors: Alain Toillie, Strasbourg; Guy Rostoucher, Otterstahl, both of France

[73] Assignee: Kuhn S.A., Saverne, France

[21] Appl. No.: 330,270

[22] Filed: Dec. 14, 1981

[30] Foreign Application Priority Data

Dec. 18, 1980 [FR] France .................. 80 27393

[51] Int. Cl.³ .......................................... A01D 35/264
[52] U.S. Cl. ........................................ 56/295; 56/192; 56/13.6
[58] Field of Search .................. 56/295, 192, 157, 256, 56/289, 13.6

[56] References Cited

U.S. PATENT DOCUMENTS

| 2,777,272 | 1/1957 | Smith et al. | 56/13.6 |
| 3,931,859 | 1/1976 | Van Der Lely | 56/13.6 |
| 4,050,224 | 9/1977 | Oosterling et al. | 56/295 |
| 4,253,294 | 3/1981 | Zweegers | 56/13.6 |

FOREIGN PATENT DOCUMENTS

| 1366072 | 9/1974 | United Kingdom | 56/13.6 |
| 2048639 | 12/1980 | United Kingdom | 56/295 |
| 2061687 | 5/1981 | United Kingdom | 56/295 |

Primary Examiner—Gene Mancene
Assistant Examiner—John Weiss
Attorney, Agent, or Firm—Ernest F. Marmorek

[57] ABSTRACT

A mower is provided which has a plurality of cutter supports which are driven to be rotated. One or more of these supports is surmounted by a rotatable shaft; and such support comprises a hub that is rotatable with the shaft thereof, and a plurality of detachable segments, each of which is secured to the hub and defines a conveying surface for the cut produce.

4 Claims, 4 Drawing Figures

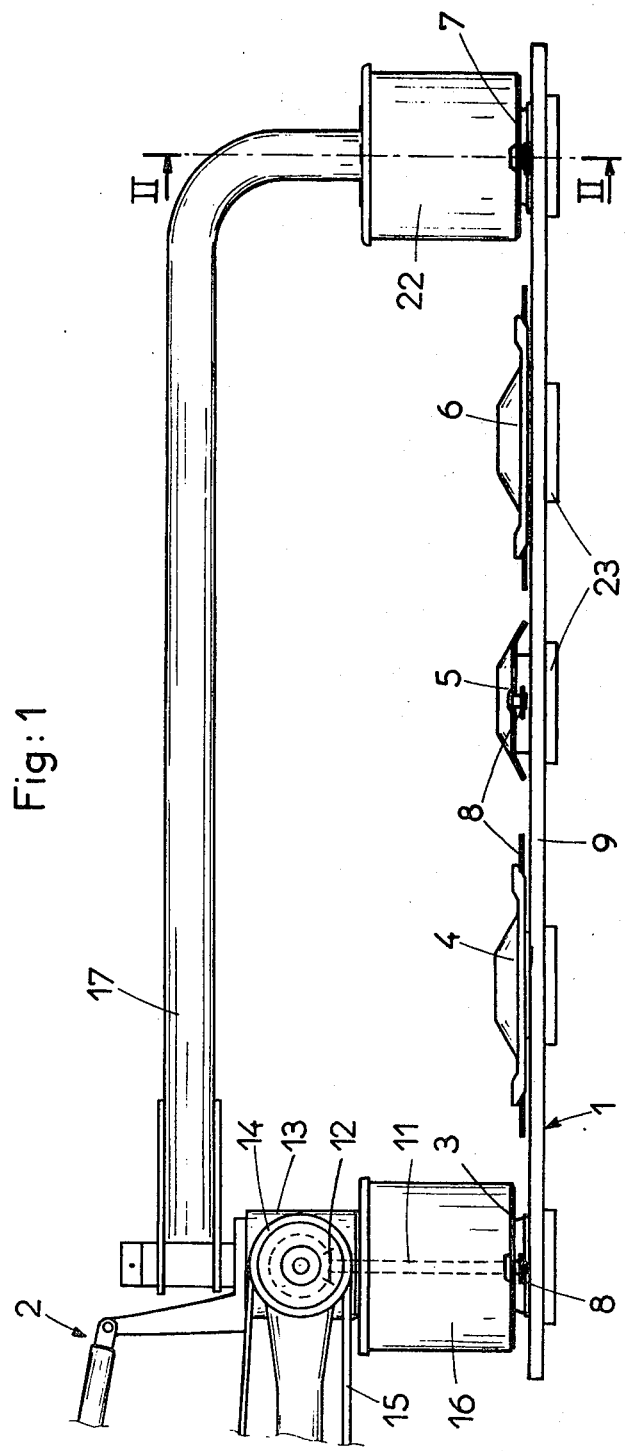

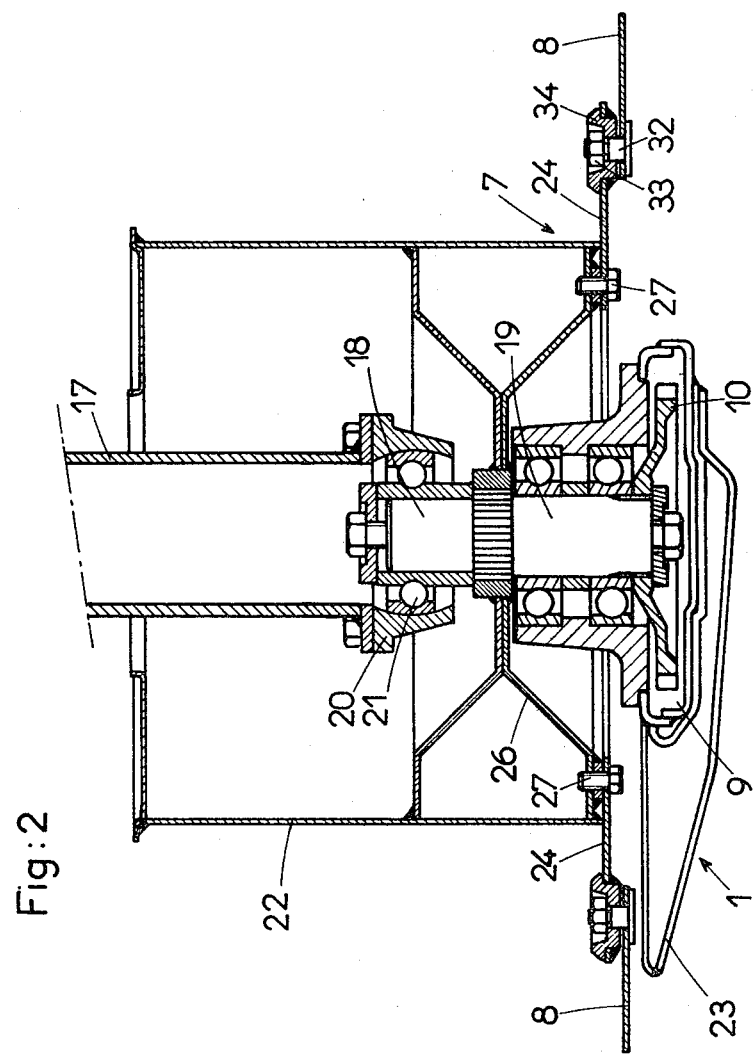
Fig:2

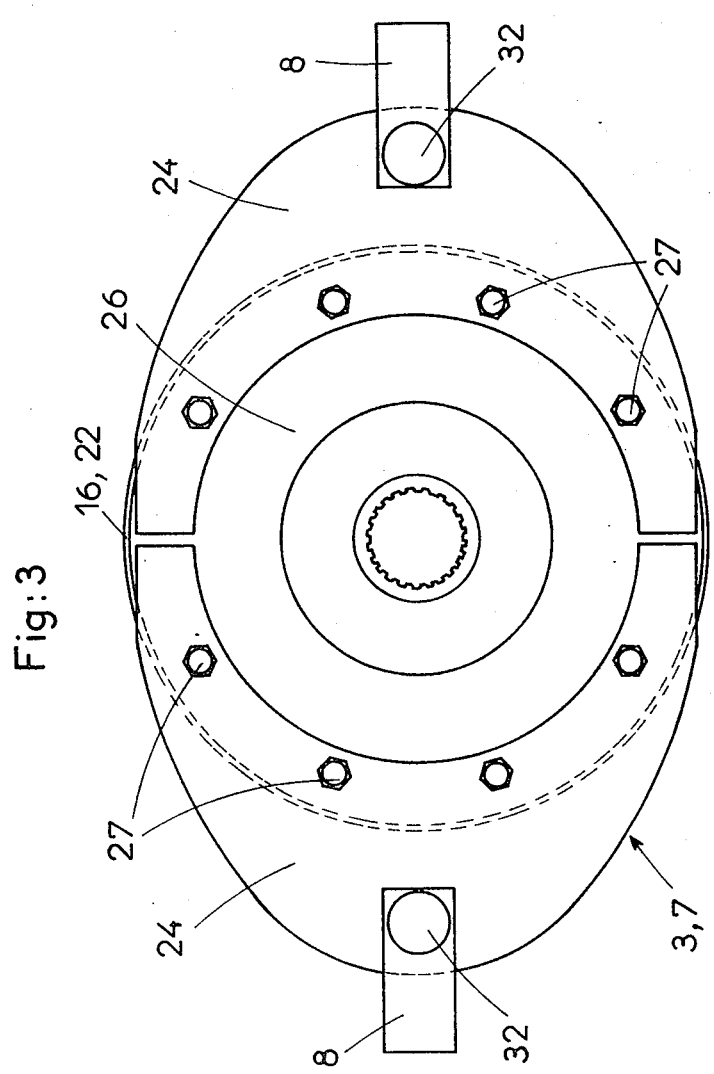

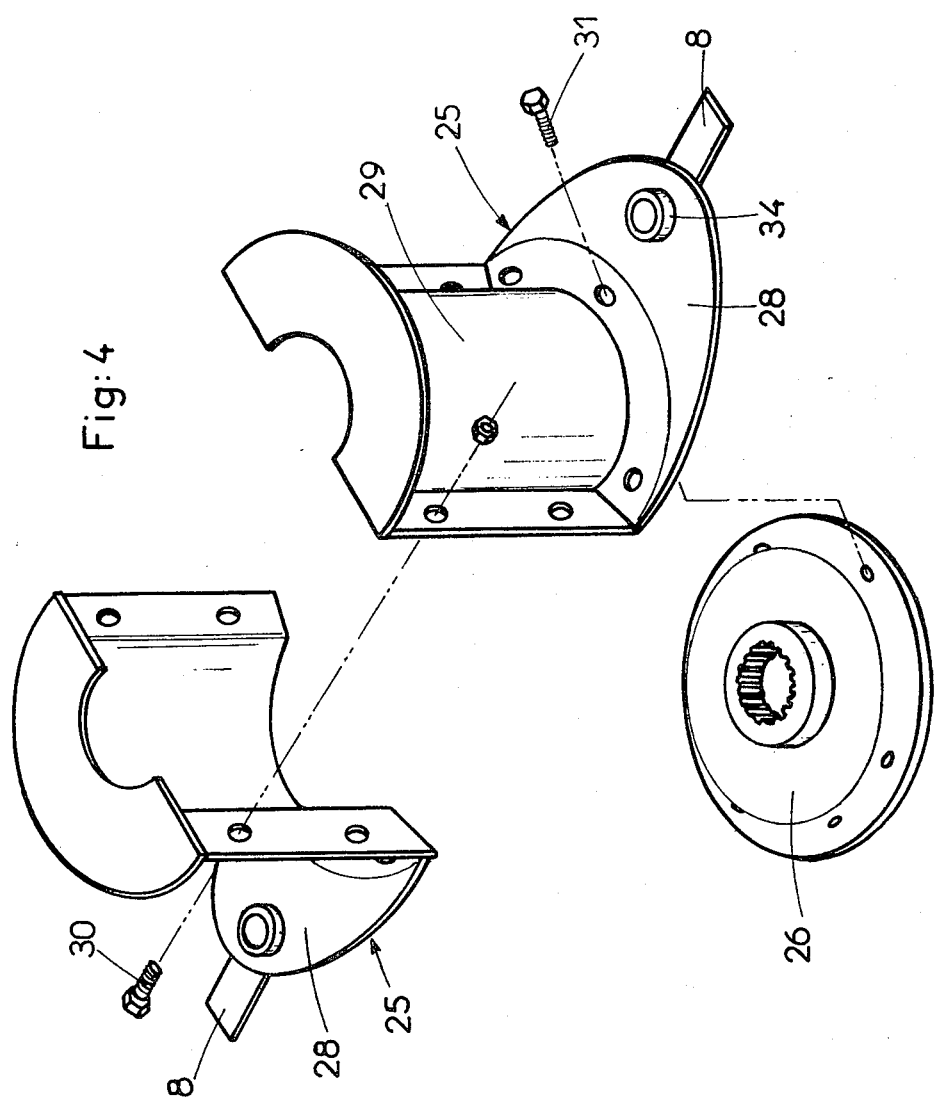
Fig: 4

MOWER

BACKGROUND OF THE INVENTION

The present invention relates to a mower or mower-conditioner that has a plurality of cutter supports driven so as to rotate, and at least one of these supports is surmounted by a driving and/or linking element, such as a shaft.

On machines of this kind, the cutter supports are made in the form of disks. They are driven so as to rotate by means of a substantially vertical shaft which drives the first one of said supports and passes through it into a casing running underneath all the supports. In this casing, said shaft drives means such as gears which make all the other supports rotate from the bottom.

Moveover, on certain rotary mowers, particularly front-mounted mowers and side-mounted mowers having a considerable working width, a link is provided between the casing located underneath the cutter supports and a reinforcement disposed above said supports. This link is produced by means of one or more substantially vertical arms attached to the rotational shaft of one or more of said cutter supports. On side-mounted mowers, this link is disposed level with the cutter support furthest away from the driving tractor so as to increase the rigidity of the cutter bar.

These driving and/or linking shafts are generally enclosed in a cylinder of greater diameter to prevent them becoming entangled in cut produce.

When said cutter support or supports traversed or topped by a driving and/or linking shaft become worn, the casing needs to be detached from said shaft so as to be able to replace said support or supports. This procedure involves numerous dismantling operations which are tiring, time consuming and hence costly.

SUMMARY OF THE INVENTION

An objective of the present invention is to facilitate the repair or replacement of said cutter supports when they become worn or damaged.

Further objects and advantages of the invention will be set forth in part in the following Specification and in part will be obvious therefrom without being specifically referred to, the same being realized and attained as pointed out in the claims hereof.

To this end, one important feature of the invention is that the cutter support or supports traversed or topped by a driving and/or linking element are made in a plurality of detachable segments each forming a conveying surface for the mown produce and being attached rigidly to a driving hub. These segments are preferably crescent-shaped, with their conveying surface substantially horizontal.

The detachable connection can be achieved by means of screws for example. In the event of wear, therefore, it is only necessary to replace said segments. As a result of this feature, it is no longer necessary to remove the entire casing carrying the cutter supports, to remedy for wear.

In accordance with another feature of the invention, each segment has both a substantially horizontal conveying surface and a substantially vertical conveying surface. The forage is primarily discharged by the substantially horizontal surfaces. The substantially vertical surfaces of the segments of one and the same support form a cylinder around the driving and/or linking element and are attached together by detachable means. Thus, these surfaces prevent cut produce wrapping itself around these elements. Furthermore, said segments can be removed rapidly. Removal of one such segment exposes a large area, allowing easy access to the driving and/or linking elements if there is a repair or a replacement to be carried out. Besides, this form of embodiment also renders it possible to replace each segment individually in the event of wear, instead of changing a complete disk and drum.

In accordance with another feature of the invention, the cutters of the supports traversed or topped by a driving and/or linking element are fixed onto the detachable segments. Thus, if the fixtures of these cutters become worn, it is merely necessary to replace the segment in question, instead of changing the entire support. This allows a saving in time and money.

BRIEF DESCRIPTION OF THE DRAWINGS

The foregoing and other objects of the invention will be best understood from the following description of exemplifications thereof, reference being had to the accompanying drawings, wherein:

FIG. 1 is a fragmentary elevational view of a mower in accordance with an embodiment of the invention;

FIG. 2 is a large scale fragmentary sectional view, taken on the line II—II of FIG. 1.

FIG. 3 is a plan view from the underside of a cutter support, on a scale similar to that of FIG. 2; and FIG. 4 is an extended view of a modified cutter support.

DESCRIPTION OF THE PREFERRED EMBODIMENTS

In carrying the invention into effect in the embodiments which have been selected for illustration in the accompanying drawings and for description in the Specification, and referring now particularly to FIG. 1, there is provided a rotary mower that includes a frame such as a cutter bar 1, and a chassis 2, illustrated only in part. The chassis 2 permits to be detachably secured to the rear of a driving tractor.

The cutter bar 1 in the exemplification shown has five supports 3,4,5,6, and 7 for cutters such as knives 8. Each of these supports is provided with two diametrically opposed cutters 8 that move along circular paths when the supports rotate.

During operation, the supports (3–7) for the cutters 8 are rotated simultaneously. The rotation is accomplished by means of transmission components, such as gears 10 (FIG. 2), which are housed in a casing 9 that runs below said supports.

The gears 10 are driven by an upright shaft 11 which runs through the first support 3 into said casing 9. The shaft itself is driven by means of suitable driving means, for example by an angle drive unit 12 that may be composed of bevel gears, and is housed in a drive casing 13 that forms a part of the chassis 2, and is spaced above the first support 3.

A grooved pulley 14 is keyed on the input shaft of the casing 13 and is in driving connection with the angle drive unit 12 and thereby, drives the shaft 11 and the gears 10. The pulley 14 is driven so as to rotate with the aid of belts 15 that pass around a second grooved pulley (not shown) which itself is driven by a transmission shaft that is connected to the power take-off of the driving tractor.

The shaft 11 furthermore serves to connect the cutter bar 1 to the support chassis 2. The shaft 11 is enclosed by a cylinder 16 that is secured to the support 3. This cylinder 16 facilitates rearward discharge of the cut produce and prevents the produce from being wrapped around the shaft 11.

A beam, for example, a hollow beam 17 (FIGS. 1,2) extends to a point near the far end of the cutter bar 1 to support the cutter bar at that far end. The beam 17 is connected with its inner end to the casing 13 and with its outer end to the far end of the cutter bar 1. Near the outer end, the beam 17 is curved downwardly, and its outer end, as best shown in FIG. 2, engages, by means of an anti-friction bearing, the upper extension 18 of a shaft 19. The support 7 rotates on the shaft 19, the shaft 19 being driven by one of the last of the gears 10, the aforesaid anti-friction bearing includes an intermediary part 20 and a ball bearing 21 with a spherical outer ring.

The beam 17 renders it possible to take a part of the load off the casing 9, enabling the casing 9 thereby to be kept thin so as to obtain a cut close to the ground. The outer end of the beam 17 is at least partly enclosed in the cylinder 22 that is secured to the outermost support 7, and prevents, similar to the cylinder 16, cut produce to wrap itself around the end of the beam 17, facilitating the discharge of the cut produce towards the rear.

On its underside, the cutter bar 1 is provided with skids 23 which enable it to slide over the ground during operation.

In accordance with an important aspect of the invention, the cutter support 3 and the cutter support 7 each include a plurality of detachable segments 24 (FIGS. 2,3) or 25 (FIG. 4). Each of these segments 24,25 defines a conveying surface for the cut produce, and is secured to a driving hub 26. The driving hub 26 rotates with the shaft 11, 19 with which the corresponding support 3,7 rotates. As best shown in FIGS. 2 and 3, the segments 24 may be substantially horizontal and crescent-shaped so as to have a large conveying surface. During operation, they discharge the cut produce towards the rear of the mower.

These segments 24 can easily be removed and replaced individually, when replacement becomes necessary due to wear due to the friction of the produce conveyed. For the purpose of removal and replacement, the segments 24 are secured to the driving hub 26 of the corresponding support 3,7, by means of screws 27. In the example shown in FIGS. 2 and 3, the screws 27 are disposed with their axes parallel to the axis of the respective shaft 11, 19 with which the corresponding support 3,7 rotates. The screws 27 are easily accessible from the rear of the cutter bar 1.

In the modification shown in FIG. 4 each segment 25 has a substantially horizontal conveying surface 28 in the shape of a crescent and a substantially vertical conveying surface 29. The segments 25 can be made in a plurality of pieces, which are assembled together, for example, by welding or they may be made in a single piece.

The cut produce is primarily discharged by the substantially horizontal conveying surfaces 28. The substantially vertical conveying surfaces 29 of the segments 25 of the respective support 3,7 form a cylinder. They can be assembled together by means of substantially horizontal bolts 30. Then, they completely enclose the driving shaft 11 of the support 3, or, respectively, the far end of the beam 17 of the support 7, and prevent cut produce from wrapping itself around these parts.

The segments 25 are secured to the driving hub 26 of the respective support 3,7 by means of screws 31 which are disposed obliquely in relation to the upright shaft 11, 19 with which the respective support 3,7 turns. This type of connection allows easy and rapid removal in the event of wear, or, for example, for access to the elements inside the cylinders that are formed by the vertical surfaces 29.

Each support 3,7 has two segments 24 or 25. Advantageously, the cutters 8 are fixed to the segments 24 or 25 on the basis of one cutter 8 per segment. The cutters 8 are secured to the respective segments by means of bolts 32, the nuts 33 of which are protected by washers 34. Replacement may be done by simply replacing the corresponding segment 24 or 25.

OPERATION

The operation of the above noted mower has been described in the preceeding description of its parts, and no separate outline of the operation appears necessary.

Recapitulating what has been stated herein before, the power is taken off the belts 15 and transmitted to the shaft 11 from where the power is transmitted by means of the gears 10 to the supports 3,4,5,6 and 7. Each of the shafts 11,19, in turn, drives its hub 26, and the hubs drive the segments 24 (FIG. 2) or 25 (FIG. 4), and the cutters 8 are secured to the segments 24 or 25.

Certain of the advantages of the invention have already been herein referred to. It may be useful, however, to allude particularly at this point to the ease and simplicity of replacement of those parts which are subject to the greatest wear and tear during the mowing operation.

While the preferred embodiments of the invention have been described in considerable detail it will be apparent to those skilled in the art to which it relates that the invention is not limited to a particular type of machine or to the type of machine shown having the particular construction described, and that the invention can be otherwise embodied, as set forth in the claims.

It is also to be understood that the invention contemplates means other than that shown or described, as set forth in the claims.

It is our intention to cover hereby all adaptations, modifications and uses of the invention which come within the practice of those skilled in the art to which it relates and the scope of the appended claims.

Having thus described the invention, what we claim as new and desire to be secured by Letters Patent, is as follows:

1. In a mower comprising in combination a plurality of rotatable cutter supports,
   transmission means housed in a casing extending below said cutter supports, for driving said cutter supports in rotation,
   at least one of said supports being in driving connection with a shaft, extending through said one support,
   said one support comprising a hub and a plurality of detachable segments defining a conveying surface for the cut produce, each segment being rigidly secured to said hub,
   each segment including a substantially horizontal conveying surface and a substantially vertical conveying surface for the cut produce,
   said substantially vertical conveying surfaces of the segments of said support forming a cylinder.

2. A mower comprising in combination,
a frame,
a plurality of rotatable cutter supports,
transmission means housed in a casing extending below said cutter supports,
said transmission means including at least one driving shaft,
at least one of said supports being in driven connection with said shaft extending through said one support,
said one support comprising a hub and a plurality of detachable segments rigidly secured to said hub,
each segment including a substantially horizontal conveying surface and a substantially vertical conveying surface for the cut produce,
said substantially vertical conveying surfaces forming together a shape similar to a cylinder.

3. A mower as claimed in claim 2, wherein each support comprises two said segments.

4. A mower as claimed in claim 3, wherein said segment carries one cutter.

* * * * *